(12) United States Patent
Hiskes

(10) Patent No.: US 6,394,750 B1
(45) Date of Patent: May 28, 2002

(54) METHOD AND DETAIL FOR PROCESSING A STATOR VANE

(75) Inventor: David James Hiskes, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 09/542,643

(22) Filed: Apr. 3, 2000

(51) Int. Cl.⁷ .............................. F01D 1/02; F01D 5/14
(52) U.S. Cl. .................. 415/189; 415/200; 416/241 R; 416/213 R
(58) Field of Search ................. 29/402.13, 888.011, 29/402.16, 889.1, 889.72, 889.721, 889.21; 416/241 R, 224, 213 R; 415/200, 189, 210.1

(56) References Cited

U.S. PATENT DOCUMENTS

| | | | |
|---|---|---|---|
| 3,574,924 A | * 4/1971 | Dibble | 416/224 |
| 3,650,635 A | * 3/1972 | Wachtell et al. | 416/241 R |
| 4,176,433 A | * 12/1979 | Lee et al. | 415/200 |
| 4,305,697 A | * 12/1981 | Cohen et al. | 415/210.1 |
| 4,326,833 A | * 4/1982 | Zelahy et al. | 416/213 R |
| 4,832,252 A | * 5/1989 | Fraser | 416/241 R |
| 5,060,842 A | * 10/1991 | Qureshi et al. | 29/402.13 |
| 5,269,057 A | * 12/1993 | Mendham | 29/889.1 |

* cited by examiner

Primary Examiner—F. Daniel Lopez
Assistant Examiner—Richard Woo
(74) Attorney, Agent, or Firm—Gene D. Fleischhauer

(57) ABSTRACT

A method and replacement detail for use in processing a stator vane for a rotary machine are disclosed. Various steps and construction details are developed which promote the ease of carrying out the process and improve the fatigue life of the processed stator vane. In one particular embodiment, a portion of the airfoil and the platform are removed in a region adjacent the leading edge of the airfoil and replaced with a replacement detail having new material at a location where cracks are known to form.

19 Claims, 6 Drawing Sheets

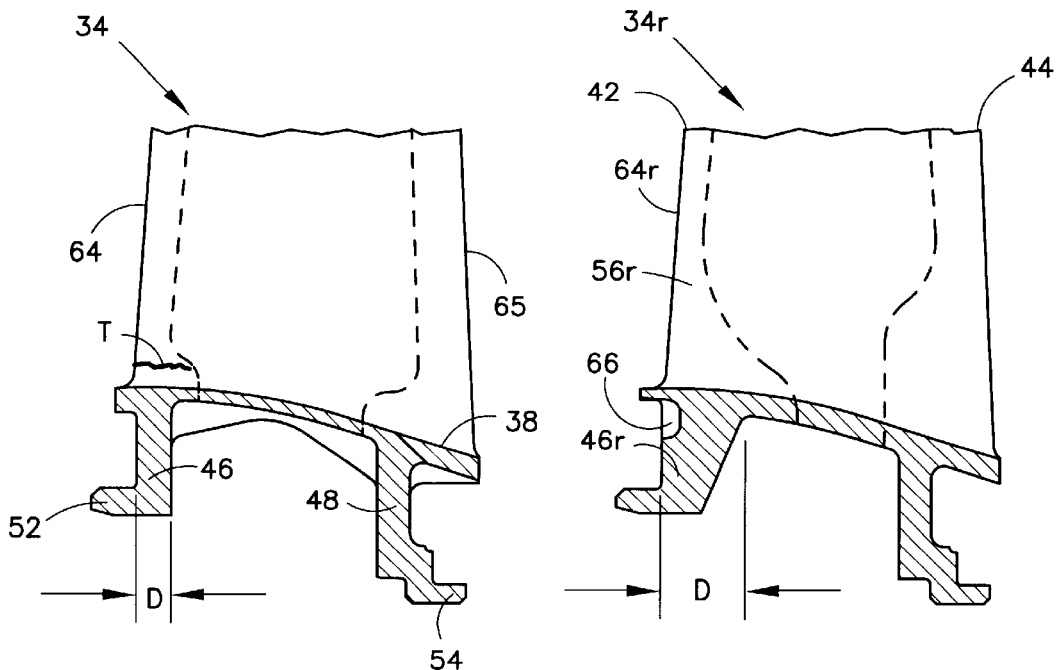
FIG.4
Prior Art
FIG.5
Prior Art
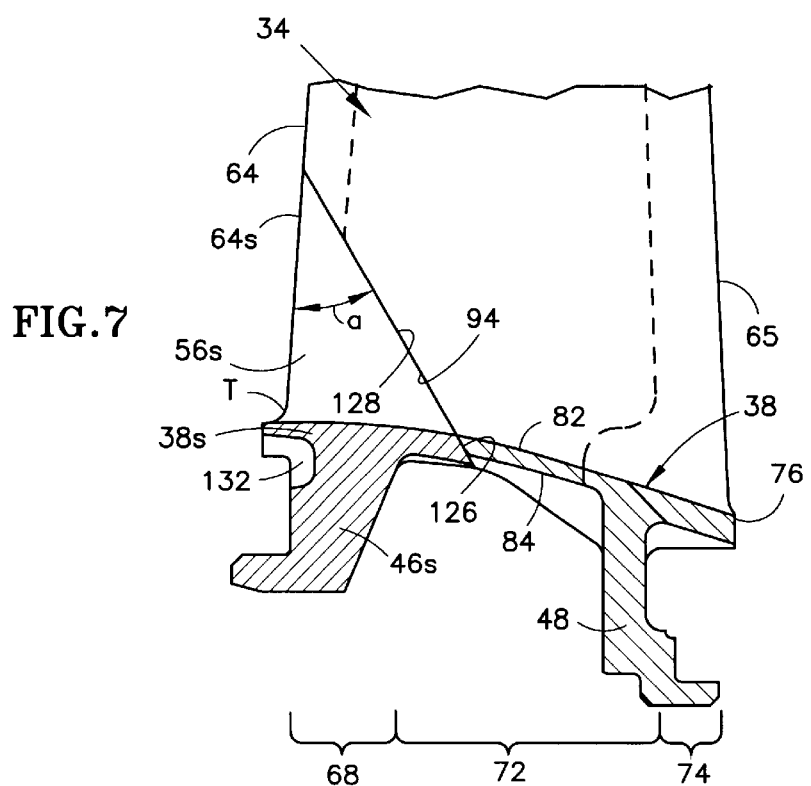
FIG.7

METHOD AND DETAIL FOR PROCESSING A STATOR VANE

TECHNICAL FIELD

This invention relates to the field of axial flow rotary machines and more particularly to a method and detail for processing, modifying or repairing a stator vane.

BACKGROUND OF THE INVENTION

FIG. 1 shows an axial flow rotary machine 10 of the turbofan, gas turbine engine type. The engine includes a compression section 12, a combustion section 14, and a turbine section 16 which are disposed an axis A. An annular flowpath 18 for working medium gases extends through the sections of the engine. The annular flowpath is the primary flowpath for the turbofan engine.

The working medium gases are compressed in the compression section 12. The compressed gases are mixed with fuel in the combustion section 14 and burned to add energy to the gases. The hot pressurized gases are expanded through the turbine section 16 to produce useful work and are discharged from the engine to produce thrust.

As shown in FIG. 1 and FIG. 2, the engine is provided with a rotor assembly 22 In the turbine section 16. The rotor assembly includes a rotor disk 24 and arrays of rotor blades which extend outwardly across the working medium flowpath, as represented by the arrays of rotor blades 26. The rotor assembly extracts energy from the gases as the gases are passed through the turbine section. The rotor assembly transfers this energy to the compression section 14 to compress the incoming working medium gases.

A stator assembly 28 extends circumferentially about the rotor assembly 22. The stator assembly supports the rotor assembly and includes a pressure vessel, as represented by the outer case 32, to confine the working medium gases to the working medium flowpath. In many embodiments, the outer case also provides a support structure for components which bound the working medium flowpath. The stator assembly includes arrays of stator vanes 34 interdigitated with the arrays of rotor blades. Each array of stator vanes is disposed about the axis A.

As shown in FIG. 2, each stator vane 34 extends circumferentially with respect to the axis A. Each stator vane typically has an inner platform 36 and an outer platform 38. The stator vane has an upstream end 42 and a downstream end 44. These ends are also called respectively the leading edge and the trailing edge of the stator vane. An upstream leg 46 and a downstream leg 48 extend radially from the outer platform. Each leg has a foot, as represented by the upstream foot 52 and by the downstream foot 54. Each foot adapts the leg to engage the outer case. One or more airfoils 56 extend radially across the working medium flowpath between the inner platform and the outer platform. The term "stator vane" includes constructions which have one airfoil or several airfoils. Stator vane constructions having several airfoils are frequently called "stator vane clusters".

The airfoil 56 of the stator vane extends spanwisely and has a pressure side 58 and a suction side 62 (shown in FIG. 3). The sides guide the working medium gases as the gases exit one array of rotor blades and enter a downstream array of rotor blades. The working medium gases push against and buffet the airfoil exerting both steady and unsteady aerodynamic forces on the airfoil. These forces are in part the result of wakes from the upstream rotor blades and bow waves from downstream rotor blades. In addition, heat is transferred from the hot working medium gases to the stator vane 34 and particularly to the airfoils 56. The heat causes thermal gradients in the stator vane. The thermal gradients are aggravated by circumferential variations in temperature of the working medium gases in the flowpath. These variations in temperature result from variations in upstream operating conditions at the combustion section 14 of the engine.

The aerodynamic and thermal forces cause cyclic stresses in the stator vane 34 and may cause cracking of the stator vane, for example, at those locations on the airfoil 56 that are subjected to high repetitive stresses. The leading edge 64 of the airfoil 56 is one location on the stator vane that is particularly vulnerable to cracking. This occurs because the airfoil is a structural beam that has a very narrow outermost fiber, that is, the relatively narrow leading edge 64. The narrow leading edge of the beam has an associated high stress concentration factor. The effect of this high stress concentration factor is aggravated by the change in geometry at the location where the airfoil (or structural beam) transitions into the outer platform 38 and is referred to as the region or junction T. This is usually the tangency point between the airfoil fillet and the airfoil.

FIG. 3 is a perspective view of three stator vanes 34. Each stator vane has three airfoils 56. FIG. 4 is a cross-sectional view of the pressure side airfoil 56 with part of the airfoil broken away. As shown in FIG. 3 and FIG. 4, cracking of the pressure side airfoil 56 frequently occurs in the leading edge 64 at the junction T, that is, the transition from the leading edge of the airfoil to the platform. With time, the crack will grow rearwardly from the leading edge and may lead to destructive failure of the stator vane. Depending on its circumferential location in the annular flowpath 18 with respect to upstream operating conditions, the stator vane may not have a cracked pressure side airfoil as shown. Instead or in addition to the pressure side airfoil, the central airfoil or suction side airfoil may crack at the leading edge. Typically, none of these stator vanes are repairable by welding or bonding repairs, such as by using diffusion bonding filler, because of the high stress concentration factors acting at the transition of the leading edge to the platform.

One approach is to replace damaged stator vanes with redesigned stator vanes. FIG. 5 is a schematic, side elevation view of a redesigned stator vane 34r which is partially in section and partially broken away. The redesigned stator vane has a leg 46r having an axial thickness or axial length D. This thickness is uniform for the entire circumferential extent of the redesigned stator vane. The thickness of the redesigned stator vane is thicker or longer in the axial direction than the thickness or axial length D of the upstream leg 46 shown in FIG. 3 and FIG. 4. The redesigned stator vane 34r has a local opening or local pocket 66 at each airfoil 56r which extends rearwardly from the upstream end 42 of the stator vane. The opening is circumferentially and axially aligned with the leading edge 64r of the airfoil. The opening interrupts the radial continuity of the stator vane and the radial continuity of the load path from the airfoil leading edge to the leg and thence to the support structure. This causes the load path to shift rearwardly. The high gas loads acting on the airfoil are not passed by the stator vane through the leading edge region next to the platform. This avoids subjecting the loads to the high stress concentration factor caused by the narrow leading edge and the transition geometry. As a result, the stator vane has an increased fatigue life. However, replacing an earlier version of the stator vane that is cracked or expected to crack with a redesigned stator vane requires the purchase of a new stator vane.

Accordingly, scientists and engineers working under the direction of applicants assignee have sought to develop a method for processing a stator vane which has a crack or which might crack in a critical location such as the transition zone from the leading edge to the platform.

SUMMARY OF INVENTION

This invention is in part predicated on the recognition that earlier version stator vanes may be modified or repaired by shifting the diffusion bonding surfaces for a replacement detail away from the leading edge to platform transition and its high concentration stress factor and forming a replacement detail having entirely new material at the junction T between the leading edge and the platform. Such a replacement detail may be used for a cracked or about to crack stator vane and may be bonded to the stator vane.

According to the present invention, a method for processing a stator vane includes removing part of the platform and leading edge region of the airfoil to remove the junction T of the leading edge and the airfoil and to form bonding surfaces on the airfoil and platform that are spaced from the junction; installing a replacement detail having bonding surfaces on an airfoil section and on a platform section that face the surfaces formed on the stator vane; and, bonding the replacement detail to the stator vane.

In accordance with one embodiment of the present invention, the method includes forming at least one bonding surface on the airfoil that faces in a generally axial direction and at least two bonding surfaces on the platform, with one facing in a generally axial direction and one facing in a generally circumferential direction.

In accordance with one embodiment of the present invention, the method includes forming surfaces on the platform that face toward each other in a generally circumferential direction.

In accordance with one embodiment of the present invention, the method is used for repairing a stator vane having a crack adjacent the junction T between the leading edge and the platform, the step of removing part of the airfoil includes removing all material bounding the crack and the step of installing a replacement detail includes replacing material at the location of the crack with new material.

In accordance with one embodiment of the present invention, the step of removing part of the stator vane includes forming at least one flat surface on the airfoil and on the airfoil section of the replacement detail and urging the surfaces together as the surfaces are bonded to each other.

In accordance with one embodiment of the present invention, the step of bonding the replacement detail includes disposing a layer of foil material between the surfaces on the airfoil and airfoil section and diffusion bonding the airfoil surfaces together and includes disposing a flowable bonding material between the platform surfaces for bonding the platform surfaces together.

In accordance with one embodiment of the present invention, the step of forming bonding surfaces on the airfoil and the platform comprises forming flat surfaces that are oriented such that planes containing platform surfaces on the stator vane are perpendicular to a plane containing the airfoil surface on the stator vane and the plane containing the airfoil section of the replacement detail in the installed condition. Planes are considered perpendicular if a line in one plane is perpendicular to any line in the other plane.

In accordance With one embodiment of the present invention, the step of removing material from the stator vane includes removing a portion of the leg extending from the platform and forming surfaces on the leg facing toward each other in a generally circumferential direction.

According to the present invention, a replacement detail for a stator vane has an airfoil section and a platform section and has at least three bonding surfaces with one located on an airfoil and facing in a generally axial direction and with two on a platform section of which at least one faces in a generally circumferential direction.

In accordance with one embodiment of the present invention, the platform has two bonding surfaces facing in opposite circumferential directions.

In accordance with one embodiment of the present invention, the replacement detail has flat surfaces such that a plane containing the airfoil section of the replacement detail is perpendicular to a plane containing at least one of the platform surfaces.

In accordance with one embodiment, the axially facing surface on the airfoil section of the replacement detail extends rearwardly from the leading edge toward the platform section leaving an acute angle between the surface and the leading edge to shift the airfoil bonding surfaces away from the junction between the platform and the leading edge of the airfoil.

In accordance with one embodiment, the replacement detail has a leg section extending in a generally radial direction from the platform section, the leg section cooperating with adjacent structure to support and position the upstream end of the stator vane; and, the replacement detail has an opening which is axially aligned with the leading edge of the airfoil for interrupting the radial continuity of the replacement detail to shift the load bearing path through the leg in the installed condition to a location on the platform which is axially rearward of the junction between the platform and the leading edge of the airfoil.

According to the present invention, a stator vane includes a platform, at least two airfoils extending from the platform, and an upstream leg for supporting the platform and airfoils, and further includes a section of the leg adjacent one of the airfoils which has an axial depth that is greater than the adjacent portion of the leg and includes an opening which interrupts the radial continuity of the cluster through the leg to the leading edge of the airfoil to decrease the load on the cluster at the junction between the leading edge and the platform.

According to the present invention, the stator vane has a replacement detail having at least three sections attached to the vane: a platform section, an airfoil section extending from the flowpath face of the platform, and a leg section which extends from the other face of the platform.

A primary feature of the method for processing a stator vane is the step of removing the junction between the leading edge of the airfoil and the platform. Another feature of the method is forming bonding surfaces which are spaced from the junction of leading edge with the platform. Still another feature is the step of bonding airfoil surfaces to join the replacement detail to the stator vane using pressure at the airfoil surfaces and using a flowable bonding material for platform surfaces that face circumferentially. In one embodiment, a feature is forming flat bonding surfaces for this circumferentially and axially facing surfaces on the platform and the axially facing surface on the airfoil.

A primary feature of the present invention is a replacement detail having an airfoil section and a platform section. The replacement detail has a junction at the leading edge of the airfoil section with the platform section. In one embodiment, the replacement detail has flat bonding surfaces which face in the axial direction and the circumferential direction. In one detailed embodiment, the replacement detail has a leg section extending from the platform section and an opening which interrupts the radial continuity of the load path from the leg to the leading edge of the airfoil section. In one embodiment, the replacement detail is formed of a material which is stronger than the material removed from the stator vane.

A primary feature of the present invention is a stator vane having at least one airfoil extending radially from a platform. A leg extends radially from the platform which adapts to the stator vane to be supported from adjacent structure of the rotary machine. The leg has an axially thicker section than the remainder of the leg beneath the leading edge region of the airfoil. An opening extends axially into the stator vane to interrupt the radial continuity of the load path extending through the leg and platform to the leading edge of the airfoil.

A primary advantage of the present invention is the ease of processing an airfoil which results from removing the junction T between the leading edge and the platform for forming bonding surfaces for the replacement detail. In one embodiment, this includes forming an axial facing surface on an airfoil and a circumferentially facing surface on the platform to bond the replacement detail in place. The use of the surfaces so oriented permits diffusion bonding under pressure against the axial facing surface and permits use of a flowable diffusion-bonding medium for the circumferentially facing surfaces. The flowable bonding medium enters the region between the surfaces by capillary action. A particular advantage is the ease of processing a stator vane which results from forming flat surfaces for locating a replacement detail against the stator vane and then bonding the replacement detail in place.

A primary advantage of the present invention is the durability of the replacement detail and the processed stator vane which has bonding surfaces spaced from the junction of the leading edge with the platform. In one embodiment, the replacement detail has a flat inclined surface on the airfoil section of the replacement detail which moves the load path from the support to the airfoil rearwardly from the leading edge, avoiding a region having high stress concentration factor in the stator vane. Another advantage is the durability of the stator vane which results from replacing material at a high stress location with entirely new material. An advantage of the present invention is the durability of the stator vane having a replacement detail which has replaced a highly stressed region of the stator vane with new material and which is bonded in place at bonding surfaces which are spaced from the high stress concentration area at the junction of the leading edge of the airfoil with the platform. Still another advantage is the flexibility of design for the processed stator vane which results from using a replacement detail which may be formed of a different material or with a different contour.

The foregoing and other features and advantages of the present invention will become more apparent in light of the following detailed description of preferred embodiments thereof as discussed and illustrated in the accompanying drawings.

BRIEF DESCRIPTION OF THE DRAWINGS

FIG. 4 is a schematic, cross-sectional, side elevation view of the stator vane shown in FIG. 2 showing the junction of the leading edge of the airfoil to the platform and a crack which has formed in the leading edge region of the airfoil.

FIG. 5 is a schematic, side elevation, cross-sectional view of a redesigned stator vane having an opening which extends rearwardly from the upstream edge of the stator vane to interrupt the radial continuity of a support leg extending from the platform of the stator vane.

FIG. 7 is a schematic, cross-sectional view of the stator vane shown in FIG. 3 having a replacement detail bonded to the stator vane to replace the junction T between the leading edge and the platform.

DETAILED DESCRIPTION

Figures 1, 2:
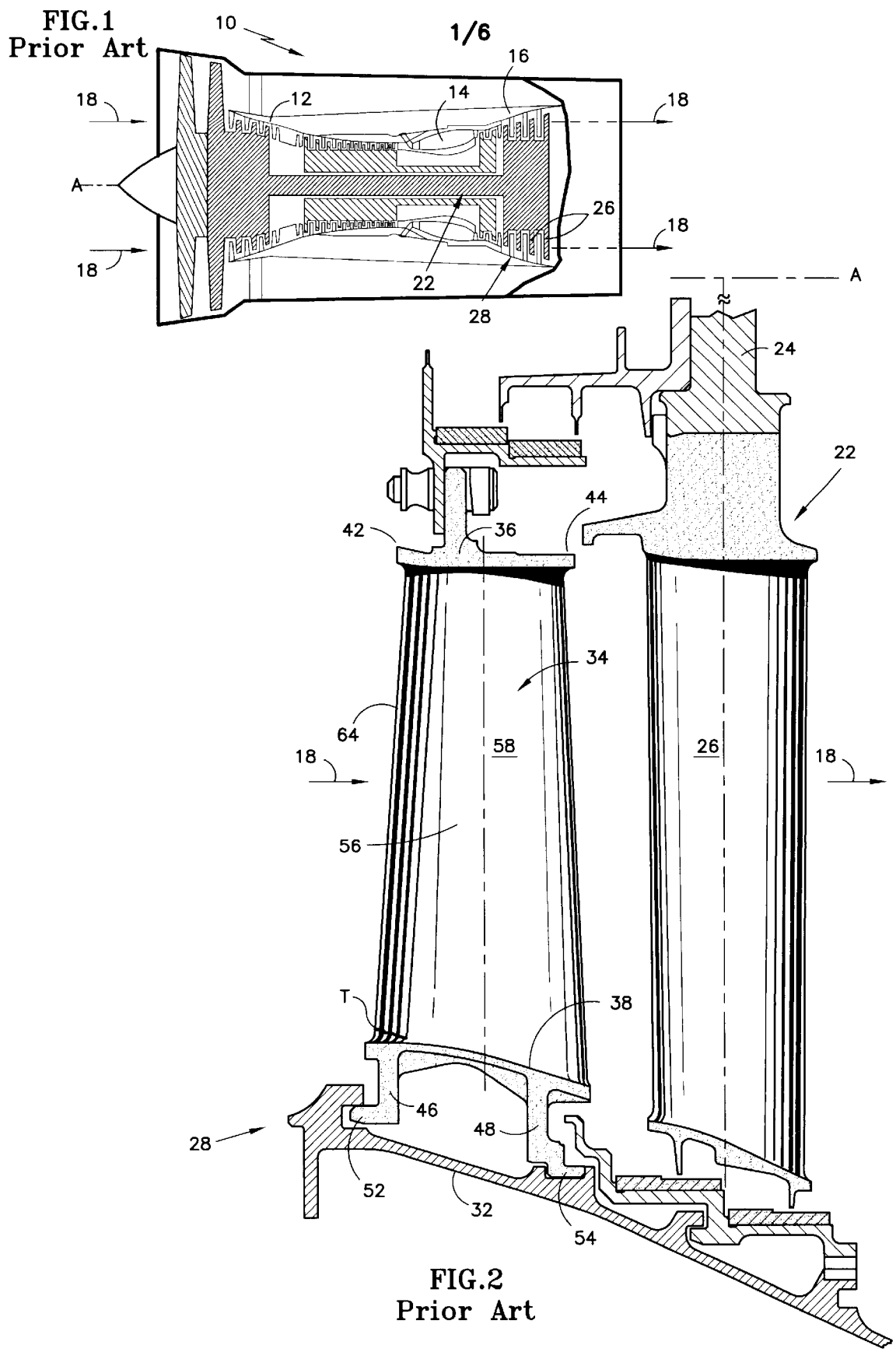
FIG. 1 is a side elevation view of an axial flow rotary machine, such as a gas turbine engine, having a compression section, a combustion section and a turbine section.
FIG. 2 is a side elevation view of a portion of the rotor assembly and the stator assembly of the engine shown in FIG. 1 with a portion of the engine broke away for clarity.
Figure 3:
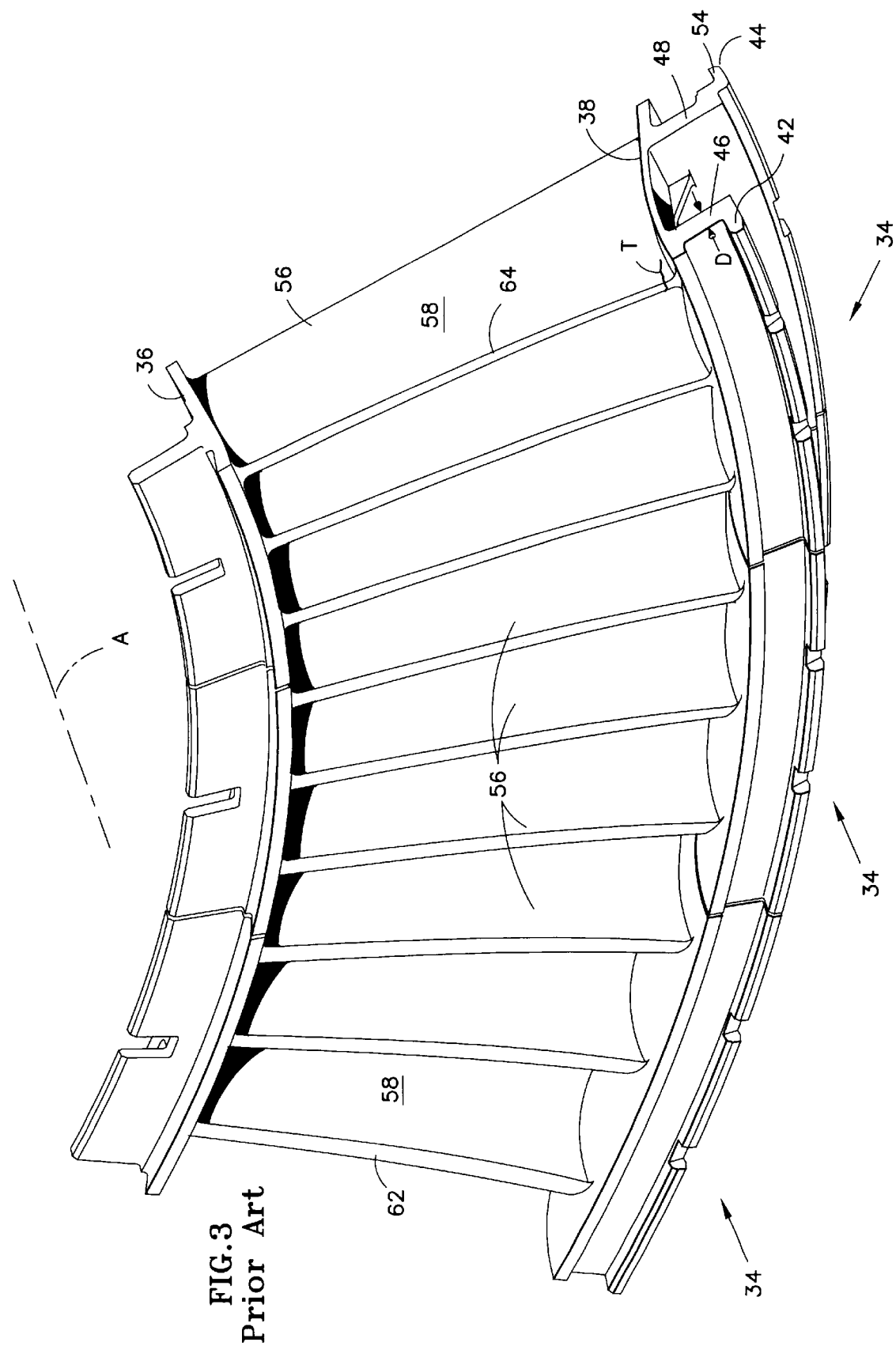
FIG. 3 is a perspective view of three stator vanes from the stator assembly shown in FIG. 2 disposed about an axis A.
Figure 6:
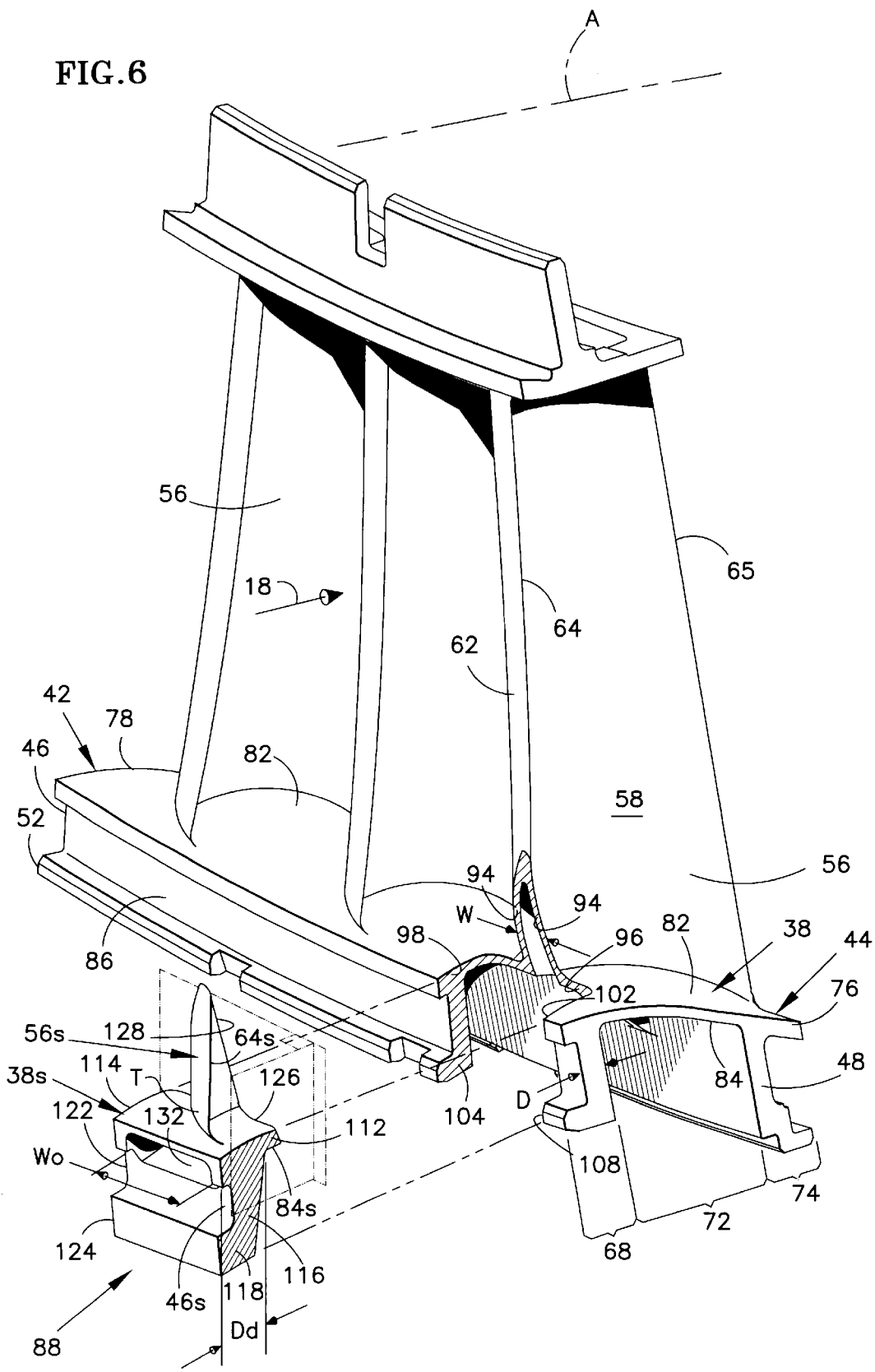
FIG. 6 is a perspective view of the stator vane shown in FIG. 3 in an intermediate form during processing of the stator vane before the step all of installing the replacement detail.

FIG. 6 and FIG. 7 are views of the stator vane 34 shown in FIG. 3 and FIG. 4 during processing. FIG. 6 is a perspective view of the stator vane and shows the stator vane after the crack has been removed from the airfoil and a replacement detail 88 is about to be installed. The pressure side 58 and the suction side 62 are walls extending between the leading edge 64 and the trailing edge 65. The sides diverge rearwardly in the circumferential direction to form the leading edge region 68, pass-through a midchord region 72, and converge to form a trailing edge region 74. The airfoil has a maximum circumferential width W as measured in the leading edge region.

The outer platform 38 has a first side 76 which faces in a generally circumferential direction. The first side of the platform is on the concave or pressure side 58 of the airfoil. The first side is commonly referred to as the pressure side of the platform. As shown in FIG. 6, the platform has a second side 78 which is spaced circumferentially from the first side. The second side is on the suction side 62 of the third stator vane 56.

The platform has a first face 82 which extends between the sides 76, 78. The first face faces in a generally radial direction. The first face bounds the flowpath 18 for working medium gases in the installed condition in the engine. The platform has a second face 84 which extends between the sides and between the upstream and downstream ends 42, 44. The second face faces in a generally radial direction away from the first face and the working medium flowpath.

As shown in FIG. 6, the upstream leg 46 of the stator vane 34 extends from the second face 84 of the platform 38 in a generally radial direction. As discussed earlier, the upstream leg has an axial length or depth D. The upstream leg is aligned in the axial direction with at least part of the leading edge region 68 of the stator vane. The upstream leg has a midportion 86 extending radially away from the platform. The upstream leg includes the foot 52 which adapts the vane to engage the support. Accordingly, the upstream leg adapts the vane to cooperate with the outer case 32, which is part of the adjacent stator structure, for supporting and positioning the upstream end 42 of the stator vane. The downstream leg 48 is spaced axially rearward from the upstream leg for supporting and positioning the downstream end 44 of the stator vane.

FIG. 6 is side elevation, a sectional view of the stator vane 34 and shows the stator vane after the replacement detail has been installed and bonded to the stator vane. As shown in FIG. 6 and FIG. 7, the upstream leg 46 is represented in part by the upstream leg 46 as shown in FIG. 6, and in part by the leg section 46s as shown in FIG. 7. The leg section 46s is part of the replacement detail 88. The replacement detail is shown in FIG. 6 in exploded fashion. The leg section 46s is axially and circumferentially aligned with the leading edge region 68 of the pressure side airfoil. In the installed condition shown in FIG. 6, the replacement detail is bonded to the adjacent portion of the upstream leg and is an integral part of the upstream leg.

The method includes removing the junction T of the airfoil leading edge 64 with the platform 38. If the material contains a crack as shown in FIG. 4, the portion of material removed entirely encompasses the crack and the junction T. As will be realized in alternate embodiments of the method, the entire portion of the upstream leg 46 need not be removed to remove the crack; instead, only part of the platform 38 and part of the airfoil 56 may be removed. The crack may be removed by any satisfactory technique for removing material, such as grinding, conventional machining or wire electro-discharge machining. The method includes removing a portion of the airfoil in the leading edge region 68 to form a bonding surface. The bonding surface is represented by the flat surface 94 which extends on both sides 58, 62 of the airfoil. The bonding surface on the airfoil faces in a generally axial direction. The bonding surface on the airfoil intersects the platform at a location axially rearwardly of the leading edge of the airfoil and may lie outside of the leading edge region.

The method further includes removing a portion of the platform 38 adjacent to the leading edge 64. This forms bonding surfaces which include a bonding surface 96 on the platform which faces in a generally axial direction and a pair of bonding surfaces 98, 102 on the platform and on the leg 104, 108 which face each other in a generally circumferential direction.

The next step in the method for processing the stator vane is to install the replacement detail 88. The replacement detail has an airfoil section 56s and a platform section 38s. Bonding surfaces on the sections are spaced from the junction T between the leading edge 64s of the airfoil section and the platform section. In one application, all of the bonding surfaces are flat within two thousandths of an inch. The surfaces face the bonding surfaces formed on the stator vane in the installed condition which are similarly flat. Thus, the replacement detail has flat bonding surfaces which face in a generally circumferential direction on the platform, as represented by the surface 112 and the surface 114. In alternate embodiments, the replacement detail may have curved or multiplanar bonding surfaces.

The leg section 46s extends away from the second face 84s of the platform section. As mentioned, the leg section is circumferentially aligned with the leading edge region 68 of the associated airfoil. The leg section has flat bonding surfaces 116, 118 and oppositely facing bonding surfaces 122, 124, each of which faces in a generally circumferential direction. The leg section has an axial depth Dd. The axial depth Dd of the leg section is greater then the axial depth D of the adjacent portion of the leg.

The replacement detail 88 also has bonding surfaces that face in the axial direction. These include a bonding surface 126 on the platform section 46s and a bonding surface 128 on the airfoil section 56s, each of which faces in a generally axial direction. As mentioned, the bonding surfaces are flat. The bonding surfaces on the replacement detail are oriented such that a plane containing the bonding surface 128 on the airfoil section is perpendicular to planes containing the bonding surfaces that face in the circumferential direction on the platform 98, 102, 104, 108 and on the leg section 116, 118, 122, 124.

The bonding surface 128 on the airfoil section 56s extends rearwardly from the leading edge 64s of the airfoil section toward the platform section 38s. The bonding surface and the leading edge form an acute angle a. In the embodiment shown, the acute angle is about thirty (30) degrees. The angle is large enough to shift the location of the airfoil bonding surface 128 at the platform section away from the junction T of the leading edge with the platform section.

The outer case 32 engages the replacement detail 88 and engages the upstream leg of the stator vane to support the replacement detail and the stator vane. The replacement detail has an opening 132 extending rearwardly from the upstream end 42 of the stator vane. The opening has a circumferential width Wo which is greater than the circumferential width W of the stator vane in the leading edge region 68. After the replacement detail is installed to the stator vane, the opening interrupts the radial continuity of the stator vane between the leading edge of the airfoil 56 and the outer case 32. This shifts rearwardly the load path through the upstream leg, which load path was immediately adjacent to the leading edge at the platform in the prior construction shown in FIG. 4. At the platform with the replacement detail 88 installed, the load path shifts from the leading edge to a location on the platform which is axially rearward of the junction between the platform and the leading edge of the airfoil. The stress concentration factor applied to the load is much lower at this rearward location than at the leading edge of the airfoil.

Figure 6A:
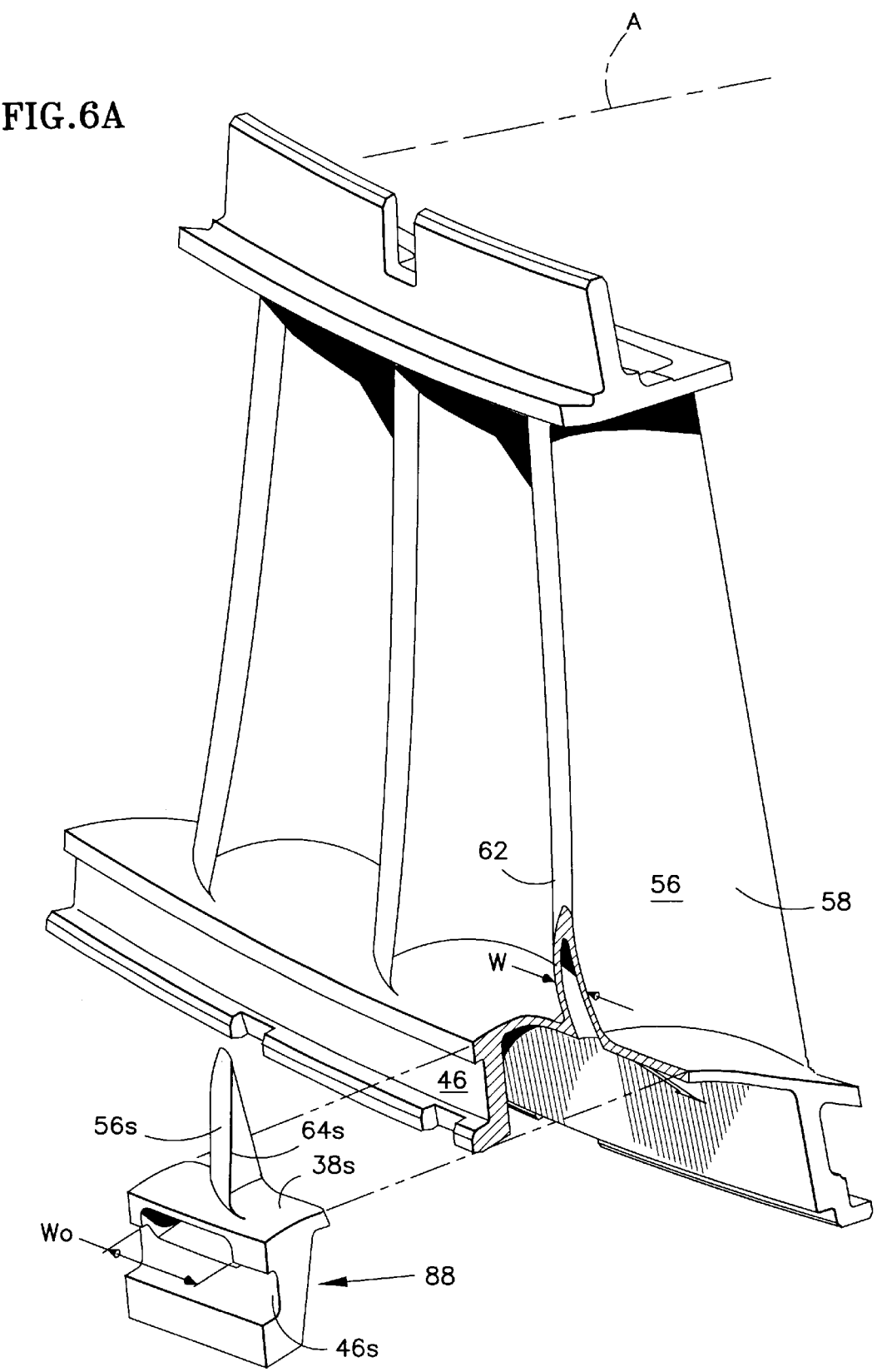
FIG. 6A is a perspective view of an alternate embodiment of the intermediate form of the stator vane shown in FIG. 7A.

FIG. 6A shows an alternate intermediate form that the stator vane 34 assumes during processing after the step of machining. The alternate intermediate form results from machining the platform such that the platform has one axial facing surface and one circumferentially facing surface. In this intermediate form, the stator vane receives a replacement detail 88 which is circumferentially longer than the replacement detail shown in FIG. 6.

Figure 8:
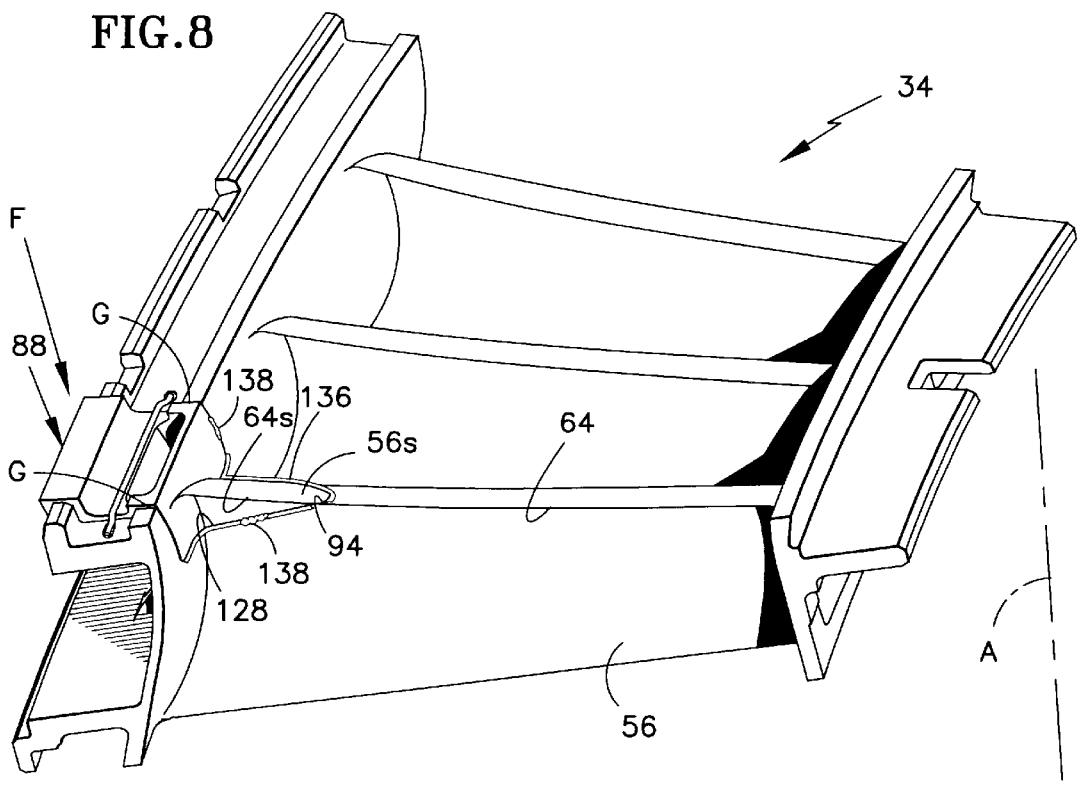
FIG. 8 is a perspective view of the stator vane shown in FIG. 6 with the replacement detail installed and a foil layer of bonding material disposed between the airfoil section of the replacement detail and the airfoil of the stator vane and beads of a flowable bonding material disposed adjacent to the bonding joints.

FIG. 8 is a perspective view of the stator vane 34 shown in FIG. 6 with the replacement detail 88 installed to the stator vane for further processing. The stator vane and replacement detail are oriented for bonding. During the bonding step, the surfaces 94, 128 of the airfoil 56 and the airfoil section 56s are disposed so that the airfoil bonding surfaces extend horizontally. A layer of alloying material 136 in the form of a foil (commonly called a "foil" or "foil material") is disposed in a faying relationship between the airfoil and the airfoil section. The foil is formed of a suitable material for diffusion bonding. Typically, the material of the foil closely resembles the parent alloy of the stator vane. The foil alloy material may include ingredients such as boron to slightly depress the melting point of the foil material below the melting point of the parent material. In this particular embodiment, the parent material is MAR-M-247 alloy material available from the Martin Marietta Corporation. An adhesive medium may be disposed between the foil and the airfoil or the foil and the airfoil section. A satisfactory adhesive is vaporized by the bonding process and does not leave a residue that would interfere with the integrity of the resulting bond.

The circumferentially facing surfaces 98, 102 and 104, 108 of the replacement detail extend parallel to the circumferentially facing surfaces of the stator vane. The replacement detail is not installed with a press fit against the circumferentially facing surfaces. Accordingly, a slight clearance gap exists between the circumferentially facing surfaces on either side of the replacement detail. The width of this slight clearance gap between parallel faces is established experimentally. The experiments are designed to establish an upper limit on the width of the gap to avoid unacceptably effecting the strength of the diffusion bonded joint between the surfaces under operative conditions of the engine. The slight gap permits the replacement detail to slidably engage the bonding surface on the airfoil. Slidably moving the replacement detail on the airfoil face in turn permits a worker to precisely align the contour of the airfoil section with the contour of the airfoil of the stator vane. After orienting the bonding surface of the airfoil section on the bonding surface of the airfoil, a means for restraining the replacement detail against slidable movement away from the bonding surface of the airfoil, such as a wire, is attached to the stator vane. The wire is tack welded to the upstream leg of the stator vane at locations on either side of the replacement detail but does not fix the replacement detail to the stator vane. Accordingly, the replacement detail can move in a direction perpendicular to the airfoil bonding surfaces but is blocked by the wire against movement in a direction parallel to the airfoil bonding surfaces. In alternate embodiments of the method, a press fit might be used. A good bond will form but a worker will not be able to easily adjust the airfoil section on the airfoil to align the airfoil surfaces.

A force F is applied to the replacement detail to urge the surfaces together. In one embodiment, a force of about one pound presses against the repair detail, causing the replacement detail to exert a force on the bonding surface and on the foil material. Thus, as the layer of foil is heated during the bonding process, the replacement detail is urged toward the bonding surfaces on the airfoil of the stator vane.

A layer of bonding filler material capable of bonding the circumferentially facing surfaces together is provided during the bonding process. The layer of material is molten during the bonding process which permits the replacement detail to move toward the airfoil bonding surface as it is urged by the force F against the airfoil bonding surface. The bonding material fills the gap between the circumferentially facing surfaces and bonds the surfaces together. One example of a satisfactory bonding filler material is Turbofix material which is the subject of U.S. Pat. No. 4,008,844 issued to Duvall et al. entitled "Method Of Preparing Surface Defects Using Metallic Filler Material".

FIG. 8 shows a bead 138 of this bonding filler material, such as Turbofix material. The bead of Turbofix material is deposited around the airfoil 56, 56s and platform to 38, 38s. The Turbofix material is in the form of a paste. The Turbofix material is placed adjacent to the bond joints of the replacement detail with the stator vane and is flowable into the joints through capillary action when melted. This material must not enter the opening in the replacement detail that is axially and circumferentially aligned with the airfoil leading edge or protrude unacceptably into the flowpath 18. The bead 138 of Turbofix material is also provided at the bonding surface of the airfoil adjacent to the layer of foil. The foil when melted provides a primary bond at this location and the Turbofix material acts secondarily to fill any depression that might have formed at the joint providing a completely smooth surface at this location.

The stator vane 34, replacement detail 88 and foil 136 are heated in a vacuum furnace to a temperature and for a time sufficient to cause diffusion bonding of the airfoil surfaces 94,128. One satisfactory method for forming the critical bond at the airfoil and airfoil section is a transient liquid phase bonding method. This method is the subject of U.S. Pat. No. 3,678,570 issued to Paulonis et al. entitled "Diffusion Bonding Utilizing Transient Liquid Phase".

As the airfoil is heated, the Turbofix material is drawn by capillary forces into the gap between the circumferentially facing surfaces between the platform and the leg. At the same time, the foil material melts and its constituents diffuse through the airfoil section and airfoil of the stator vane. One satisfactory temperature is in excess of twenty-two hundred (2200) degrees Fahrenheit at a vacuum of approximately five ten-thousandths (0.0005) Torr with a leak rate that is lower than fifteen (15) microns of mercury per hour maximum. The vacuum is reduced by allowing an inert gas to enter the chamber after a predetermined period of time, depending on the bonding material. The vacuum may reduce to a level of one thousand five hundred lo two thousand five hundred (1500–2500) microns of mercury partial pressure using an inert gas, such as argon. The stator vane is maintained at a required temperature for the period of time sufficient to complete bonding followed by controlled cooling to a temperature of about sixteen hundred (1600) degrees Fahrenheit. Blending or polishing of the area may be used to remove excess material. The front leg and foot are machined to the final contour to match the requisite part drawings.

Figure 9:
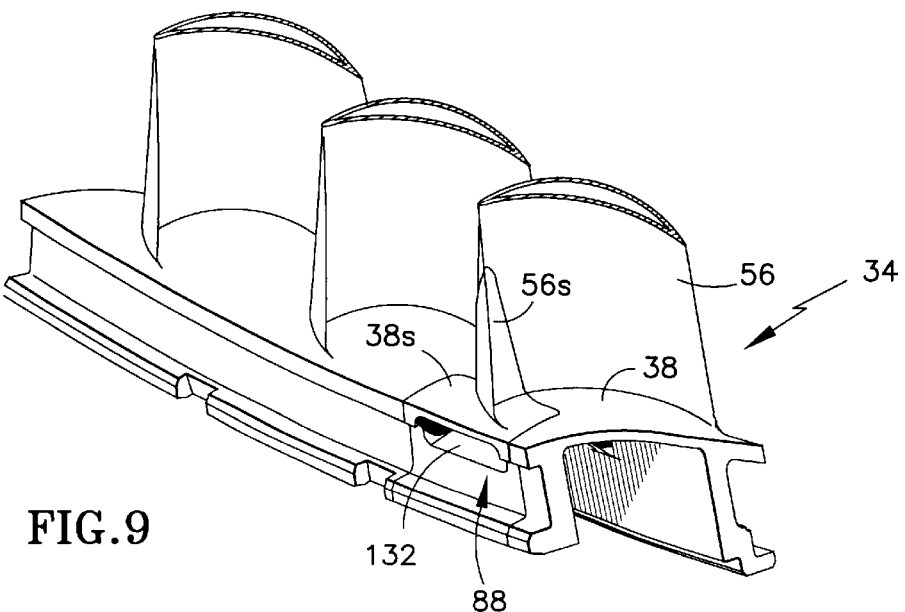
FIG. 9 is a perspective view of the turbine vane shown in FIG. 6 and 7 with a portion of the stator vane broken away to show the replacement detail bonded in place to the stator vane and after the final contour of the replacement detail has been machined to its final configuration.

FIG. 9 is a perspective view of the turbine vane shown in FIGS. 6 and 7 with a portion of the stator vane broken away to show the replacement detail bonded in place to the stator vane and after the final contour of the replacement detail has been machined to its final configuration.

Under operative conditions, the stator vane 84 is installed in the engine 10 and subjected to the aerodynamic forces discussed above. Loads acting on the airfoil 56 are passed through the platform 88 to the upstream and downstream legs 46, 48 and thence to the: support structure, as represented by the outer case 32. Loads are passed rearwardly through the transition between the airfoil and the platform at a location which is rearwardly of the leading edge. This avoids impacting loads from the airfoil with the stress concentration factor at the junction T caused by the leading edge which is the outermost element of the airfoil beam.

In addition, the region about the junction T where the high stress riser is present and where creep cracking often occurs is totally replaced by the encompassing volume of the new cast alloy of the replacement detail. Replacing this region with new material provides a processed stator vane which has not been subjected to any fatigue cycling in this region. Accordingly, the processed vane has a low cycles fatigue strength which is the same as or nearly the same as a brand-new vane in this region.

The bonding joint 94, 108 between the airfoil section 56s of the replacement detail 88 and the airfoil 56 of the stator vane has a smaller material strength than the material strength of the cast alloy. Locating the bonding joint by a predetermined distance from the critical junction T between the leading-edge and platform with its associated high stress concentration factor ensures the bonding joint will not become a new failure location. In addition, the bonding joint formed with the foil is stronger than the bond resulting from the use of the Turbofix material and provides an acceptable measure of strength to a modified stator vane having a replacement detail. The Turbofix material, in turn, provides a measure of strength at the less critical location in the leg section and platform section and permits use of bonding foil (and its stronger joint) by enabling a force to urge the replacement detail against the foil 136 and airfoil bonding surface 94 during the bonding process.

The replacement detail 88 has a leg section 46s which engages the support structure, such as with the foot 52s. An advantage of such an embodiment is that the replacement detail and the vane 34 are each attached to the engine case 32 with cast material and do not rely solely on the airfoil bonding joint to block either from entering the flowpath. A bonding failure at the airfoil might allow the airfoil section (of the replacement detail) and the airfoil (of the stator vane) to separate but the bond at the upstream leg and the mechanical attachment of the leg section to the outer case will prevent the replacement detail from entering the flowpath. In case of the unlikely failure of all bonding joints, the stator vane, the outer case, and the forces exerted by the working medium gases trap the replacement detail and will likely prevent the detail from entering the working medium flowpath.

Another advantage is the design flexibility of the method and of the use of a replacement detail to replace a critical portion of the stator vane. The replacement detail could have a new, stronger material or a redesigned contour which is then introduced into the stator vane by the use of the replacement detail. For example, the replacement detail may be made of the same cast alloy as the stator vane or an even stronger cast alloy. This strength will aid the stator vane in preventing the vane from recracking at the leading-edge location T and may even avoid the need to form an opening at the upstream end of the stator vane. Finally, the replacement detail could incorporate revised geometry to change the stress field in the repaired or modified stator vane to prevent recracking at the previously troublesome area on the stator vane. The replacement detail 88 is an example of a detail having a changed contour by the been having an opening 132 at the upstream end of the stator vane.

Although the invention has been shown and described with respect to detailed embodiments thereof, it should be understood by those in the art that various changes in form and detail thereof may be made without departing from the spirit and scope of the claimed invention.

We claim:

1. A method for processing a stator vane of a rotary machine, the stator vane extending circumferentially with respect to an axis A, the stator vane having a platform, and at least one airfoil which extends from the platform and which has a leading edge, comprising: removing the junction of the leading edge with the platform by removing a portion of the leading edge region of the airfoil to form at least one bonding surface on the airfoil facing in a generally axial direction and removing a portion of the platform adjacent the leading edge to form at least one bonding surface on the platform facing in a generally circumferential direction; installing a replacement detail having an airfoil section and a platform section and bonding surfaces which are spaced from the junction and which face the bonding surfaces formed on the stator vane in the installed condition; and bonding) the replacement detail to the stator vane by forming bonds each of which has a bond strength at each bonding surface and wherein the bond strength at the airfoil section is greater than the bond strength at the platform section between circumferentially facing surfaces.

2. The method as claimed in claim 1 wherein the step of removing a portion of the platform includes forming at least two bonding surfaces on the platform facing circumferentially toward each other.

3. The method as claimed in claim 2 wherein the method is used for repairing a stator vane having a crack adjacent the junction between the leading edge of the airfoil and the platform, and wherein the step of removing part of the airfoil includes removing all material bounding the crack and the step of installing a replacement detail includes replacing the material bounding the crack with new material.

4. The method as claimed in claim 3, wherein the step of bonding the replacement detail includes disposing a layer of foil material between the airfoil surfaces and diffusion bonding the airfoil surfaces together and includes disposing a flowable bonding material between the platform surfaces and bonding the platform surfaces together.

5. The method as claimed in claim 2, wherein the stator vane has an upstream end and a leg extending from the platform and wherein the step of removing part of the stator vane includes forming at least one flat surface on the airfoil, wherein the step of installing a replacement detail includes forming at least one flat surface on the airfoil section of the replacement detail, forming an upstream leg section which extends in a generally radial direction from the platform section for adapting the detail to cooperate with adjacent support structure and to support and position the upstream end of the stator vane and forming an opening in the replacement detail which is axially aligned with the leading edge of the airfoil section for interrupting the radial continuity of the replacement detail adjacent the leading edge to shift the load path through the leg section to a location on the platform section which is axially rearward of the junction between the platform section and the leading edge of the airfoil section and wherein the step of bonding the replacement detail to the stator vane includes urging the flat surfaces on the airfoil and on the airfoil section together as the surfaces are bonded to each other.

6. The method as claimed in claim 5, wherein the step of bonding the replacement detail includes disposing a layer of foil material between the airfoil surfaces and diffusion bonding the airfoil surfaces together and includes disposing a flowable bonding material between the platform surfaces and bonding the platform surfaces together.

7. The method as claimed in claim 4, wherein the step of forming bonding surfaces on the airfoil and the platform comprises forming flat surfaces that are oriented such that planes containing the platform bonding surfaces are perpendicular to a plane containing the airfoil bonding surface on the stator vane and the plane containing the airfoil bonding surface of the airfoil section of the replacement detail in the installed condition.

8. The method as claimed in claim 7, wherein the step of removing material from the stator vane includes removing a portion of the leg extending from the platform and forming surfaces on the leg facing toward each other in a generally circumferential direction and forming a leg section on the replacement detail having circumferentially facing bonding surfaces.

9. The method as claimed in claim 2, wherein the step of bonding the replacement detail includes disposing a layer of foil material between the airfoil surfaces and diffusion bonding the airfoil surfaces together and includes disposing a flowable bonding material between the surfaces and bonding the platform surfaces together.

10. A replacement detail for a stator vane having a platform section having at least one platform bonding surface which faces in a generally circumferential direction and at least one platform bonding surface which faces in a generally axial direction; having an airfoil section extending from the platform section, the airfoil section having a leading edge which has a junction with the platform section and having a bonding surface which faces in a generally axial direction, the platform and airfoil bonding surfaces being spaced from the junction of the leading edge with the platform; and, having an upstream leg section which extends in a generally radial direction from the platform section and which adapts the detail to cooperate with adjacent support structure and to support and position the upstream end of the stator vane and wherein the replacement detail has an opening which is axially aligned with the leading edge of the airfoil section for interrupting the radial continuity of the replacement detail adjacent the leading edge to shift the load path through the leg section to a location on the platform section which is axially rearward of the junction between the platform section and the leading edge of the airfoil section.

11. The replacement detail as claimed in claim 10, wherein the replacement detail has flat bonding surfaces such that planes containing the platform bonding surfaces facing circumferentially are perpendicular to a plane containing the bonding surface on the airfoil section of the detail.

12. The replacement detail as claimed in claim 10, wherein the axially facing bonding surface on the airfoil section of the replacement detail extends rearwardly from the leading edge and toward the platform section leaving an acute angle between the leading edge and the plane of the airfoil bonding surface to shift the location of the airfoil bonding surface away from the junction between the platform section and the leading edge of the airfoil.

13. The replacement detail as claimed in claim 12 wherein the leg section has two flat bonding surfaces, each of the leg bonding surfaces lying in the same plane as an associated flat bonding surface on the platform section.

14. A replacement detail for a stator vane having a platform section having at least one platform bonding surface which faces in a generally circumferential direction and at least one platform bonding surface which faces in a generally axial direction; having an airfoil section extending from the platform section, the airfoil section having a leading edge which has a junction with the platform section and having an airfoil bonding surface which faces in a generally axial direction, which lies in a plane and which extends rearwardly from the leading edge and toward the platform section leaving an acute angle between the leading edge and the plane of the airfoil bonding surface to shift the location of the airfoil bonding surfaces in a downstream direction away from the junction between the platform section and the leading edge of the airfoil and wherein the platform and airfoil bonding surfaces are spaced from the junction of the leading edge with the platform.

15. A stator vane for an axial flow rotary machine having a flow path for working medium gases and having a support for the vane, the stator vane having an upstream end, a downstream end and extending axially from the upstream end to the downstream end and circumferentially with respect to an axis A, which comprises:
   a platform having a first side and a second side spaced circumferentially from the first side, the platform having
      a first face which extends between the sides and faces in a generally radial direction to adapt the stator vane to bound the working medium flowpath, and,
      a second face which extends between the sides and faces in a generally radial direction away from the first face;
   at least two airfoils extending from the first face of the platform, each airfoil having a leading edge, a trailing edge, and a leading edge region, each airfoil transitioning spanwisely into the platform;
   an upstream leg having an axial depth D, the upstream leg extending from the second face of the platform in a generally radial direction, which is axially aligned with at least part of the leading edge region and which adapts the stator vane to cooperate with adjacent engine structure to support and position the upstream end of the stator vane, the leg having
      a leg section which is circumferentially aligned with one of said leading edge regions, the leg section having an axial depth Dd which is greater than the axial depth D of the adjacent portion of the leg,
         wherein the leg section has an opening which extends rearwardly from the upstream end of the vane and which is axially aligned with the leading edge of the airfoil to interrupt the radial continuity of the stator vane between the leading edge of the airfoil and the support to shift rearwardly the load path through the leg to a location on the platform which is axially rearward of the junction between the platform and the leading edge of the airfoil.

16. The stator vane as claimed in claim 15 wherein the airfoil has a suction side and a pressure side extending between the leading edge and the trailing edge which diverge rearwardly in the circumferential direction to form the leading edge region and converge to form a trailing edge region, the airfoil having a circumferential width W and wherein the opening has a circumferential width Wo which is greater than the circumferential width W.

17. The stator vane as claimed in claim 16 wherein the stator vane further includes a replacement detail having a platform section which has flat bonding surfaces at least one of which faces in a generally circumferential direction and is bonded to the adjacent portion of the stator vane, and an airfoil section having a flat bonding surface facing in a generally axial direction which is bonded to the adjacent portion of the airfoil and which is oriented such that planes containing the flat circumferentially facing surfaces on the platform section are perpendicular to a plane containing the flat airfoil section of the detail and the bonding surface on the airfoil of the stator vane.

18. The stator vane as claimed in claim 17 wherein the axially facing surface on the airfoil section of the replacement detail extends rearwardly from the leading edge toward the platform section leaving an acute angle between the surface and the leading edge to shift the bonding surfaces away from the fillet radiuses at the junction between the platform and the leading edge of the airfoil.

19. A stator vane for an axial flow rotary machine having a flow path for working medium gases and a support for the vane, the vane having an upstream end and a downstream end and extending circumferentially with respect to an axis A, which comprises:
   a platform having a first side and a second side spaced circumferentially from the first side, the platform having
      a first face which extends between the sides and faces in a generally radial direction to adapt the stator vane to bound the working medium flowpath, and, a second face which extends between the sides and faces in a generally radial direction away from the first face flowpath;

at least two airfoils extending from the first face of the platform, each airfoil having a leading edge, a trailing edge, and a suction side and a pressure side extending between the leading edge and the trailing edge which diverge rearwardly in the circumferential direction to form a leading edge region and converge to form a trailing edge region, the side transitioning spanwisely into the platform;

an upstream leg having an axial depth D which extends from the second face of the platform in a generally radial direction, which is axially aligned with at least part of the leading edge region and which adapts the stator vane to cooperate with adjacent engine structure to support and position the upstream end of the stator vane, the leg having a midsection extending radially away from the platform and, a foot which adapts the vane to engage the support: and, a replacement detail bonded to the vane adjacent one of said airfoils, having a platform section which has flat bonding surfaces which face in a generally circumferential direction, a leg section which extends away from the second face of the platform and which is circumferentially aligned with one of said leading edge region, the leg section having flat bonding surfaces which face in a generally circumferential direction, and having an axial depth Dd which is greater than to the axial depth D of the adjacent portion of the leg, and, an airfoil section having a bonding surface facing in a generally axial direction which is flat and which is oriented such that planes containing the flat surfaces on the platform section and leg section are perpendicular to a plane containing the flat airfoil section of the detail;

wherein the axially facing surface on the airfoil section of the replacement detail extends rearwardly from the leading edge toward the platform section leaving an acute angle between the surface and the leading edge to shift the bonding surfaces away from the junction between the platform and the leading edge of the airfoil;

wherein the replacement detail has an opening extending rearwardly from the leading edge surface of the replacement detail which is axially aligned with the leading edge of the airfoil to interrupt the radial continuity of the replacement detail between the leading edge of the airfoil and the support to shift rearwardly the load path through the leg to a location on the platform which is axially rearward of the junction between the platform and the leading edge of the airfoil; and, wherein the foot on the replacement detail traps the replacement detail against radial movement and the bonding surfaces trap the detail against rearward axial movement and circumferential movement.

\* \* \* \* \*